(12) United States Patent
Thomassin et al.

(10) Patent No.: US 11,713,129 B2
(45) Date of Patent: Aug. 1, 2023

(54) NORMAL MODE OPERATION OF HYBRID ELECTRIC PROPULSION SYSTEMS

(71) Applicant: PRATT & WHITNEY CANADA CORP., Longueuil (CA)

(72) Inventors: Jean Thomassin, Ste Julie (CA); Manuel Acuna, Machesney Park, IL (US); Joseph Kehoe, Vernon, CT (US); Tatjana Pekovic, Saint Lambert (CA)

(*) Notice: Subject to any disclaimer, the term of this patent is extended or adjusted under 35 U.S.C. 154(b) by 647 days.

(21) Appl. No.: 16/707,992

(22) Filed: Dec. 9, 2019

(65) Prior Publication Data

US 2020/0277063 A1 Sep. 3, 2020

Related U.S. Application Data

(60) Provisional application No. 62/812,662, filed on Mar. 1, 2019.

(51) Int. Cl.
*B64D 31/06* (2006.01)
*B64D 27/24* (2006.01)
(Continued)

(52) U.S. Cl.
CPC ............. *B64D 31/06* (2013.01); *B64D 27/24* (2013.01); *B64D 31/14* (2013.01); *B64D 2027/026* (2013.01)

(58) Field of Classification Search
CPC .............................................. B64D 2027/024
See application file for complete search history.

(56) References Cited

U.S. PATENT DOCUMENTS

| 7,023,216 B2 | 4/2006 | Prema et al. |
| 7,513,119 B2 | 4/2009 | Zielinski et al. |

(Continued)

FOREIGN PATENT DOCUMENTS

| EP | 2889221 A1 | 7/2015 |
| EP | 3434592 A1 | 1/2019 |

(Continued)

OTHER PUBLICATIONS

International Search Report and Written Opinion issued in corresponding PCT application No. PCT/US2019/065266, dated Sep. 28, 2020.

(Continued)

*Primary Examiner* — Nicholas McFall
(74) *Attorney, Agent, or Firm* — Norton Rose Fulbright Canada LLP

(57) ABSTRACT

A hybrid electric engine control module (ECU) configured to be operatively connected to a hybrid electric aircraft powerplant having a heat engine system and an electric motor system to control a torque output from each of the heat engine system and the electric motor system, the ECU being configured to determine whether the electric motor system and/or the heat engine system are in a normal mode such that the electric motor system and/or the heat engine can provide a predetermined amount of torque (e.g., full power). The ECU can be configured to receive a total torque setting and split output power between the electric motor system and the heat engine system in accordance with the normal mode as a function of the total torque setting. The ECU can be configured to detect and command recharging or regenerating of the battery system in some flight conditions.

24 Claims, 13 Drawing Sheets

(51) Int. Cl.
*B64D 27/02* (2006.01)
*B64D 31/14* (2006.01)

(56) References Cited

U.S. PATENT DOCUMENTS

| | | | |
|---|---|---|---|
| 7,772,791 | B2 | 8/2010 | Lim et al. |
| 8,155,801 | B2 | 4/2012 | Chang et al. |
| 8,423,214 | B2 | 4/2013 | Kshatriya |
| 8,610,382 | B2 | 12/2013 | Goldammer et al. |
| 8,727,271 | B2 | 5/2014 | Salyer |
| 8,831,816 | B2 | 9/2014 | Kwon et al. |
| 8,831,864 | B1 | 9/2014 | Chen et al. |
| 8,868,278 | B2 | 10/2014 | Amano |
| 8,931,732 | B2 | 1/2015 | Sirohi et al. |
| 8,958,936 | B2 | 2/2015 | Treharne et al. |
| 9,045,223 | B2 | 6/2015 | Connaulte et al. |
| 9,174,741 | B2 | 11/2015 | Suntharalingam et al. |
| 9,181,866 | B2 | 11/2015 | Jensen et al. |
| 9,370,992 | B2 | 6/2016 | Holmes et al. |
| 9,561,860 | B2 | 2/2017 | Knapp et al. |
| 9,714,025 | B2 | 7/2017 | Yang et al. |
| 9,789,768 | B1 | 10/2017 | Meier |
| 9,937,803 | B2 | 4/2018 | Siegel et al. |
| 10,000,202 | B2 | 6/2018 | Park et al. |
| 10,006,375 | B1 | 6/2018 | Wagner et al. |
| 10,040,566 | B2 | 8/2018 | Waltner |
| 10,124,886 | B2 | 11/2018 | Perkins et al. |
| 10,131,442 | B2 | 11/2018 | Waltner et al. |
| 10,137,981 | B2 | 11/2018 | Miller et al. |
| 10,183,664 | B2 | 1/2019 | Yang et al. |
| 10,207,698 | B2 | 2/2019 | Kim et al. |
| 10,273,019 | B2 | 4/2019 | Sands et al. |
| 10,351,253 | B2 | 7/2019 | Dong et al. |
| 10,382,225 | B2 | 8/2019 | Dormiani et al. |
| 2011/0168835 | A1 | 7/2011 | Oliver |
| 2011/0198439 | A1 | 8/2011 | Rotger et al. |
| 2012/0119020 | A1 | 5/2012 | Burns et al. |
| 2012/0153076 | A1 | 6/2012 | Burns et al. |
| 2012/0209456 | A1* | 8/2012 | Harmon ............. B64D 35/08 903/903 |
| 2013/0087654 | A1 | 4/2013 | Seibt |
| 2014/0010652 | A1* | 1/2014 | Suntharalingam ..... B64D 27/02 475/5 |
| 2014/0138479 | A1 | 5/2014 | Vieillard et al. |
| 2014/0158816 | A1 | 6/2014 | DeLorean |
| 2015/0042155 | A1 | 2/2015 | Vieillard et al. |
| 2015/0203092 | A1 | 7/2015 | Johri et al. |
| 2015/0353189 | A1 | 12/2015 | Kharitonov |
| 2016/0122007 | A1 | 5/2016 | Cox et al. |
| 2016/0375994 | A1* | 12/2016 | Rossotto ............. B64C 27/14 701/3 |
| 2017/0066539 | A1 | 3/2017 | van der Westhuizen et al. |
| 2017/0159574 | A1 | 6/2017 | Paul et al. |
| 2018/0002025 | A1 | 1/2018 | Lents et al. |
| 2018/0134413 | A1 | 5/2018 | Halsey et al. |
| 2018/0194483 | A1 | 7/2018 | Schwöller |
| 2018/0208305 | A1 | 7/2018 | Lloyd et al. |
| 2018/0346139 | A1 | 12/2018 | Ferran et al. |
| 2018/0354615 | A1 | 12/2018 | Groninga et al. |
| 2019/0031333 | A1 | 1/2019 | Groninga et al. |
| 2022/0048639 | A1* | 2/2022 | Kamio ............. B64D 45/00 |

FOREIGN PATENT DOCUMENTS

| | | |
|---|---|---|
| JP | 2011006041 A | 1/2011 |
| JP | 2017121925 A | 7/2017 |
| KR | 101615486 B1 | 4/2016 |
| KR | 101682670 B1 | 12/2016 |
| WO | 2008/125077 | 10/2008 |
| WO | 2011037852 | 3/2011 |
| WO | 2014/137365 | 9/2014 |

OTHER PUBLICATIONS

Extended European Search Report issued, of the European Patent Office, dated Oct. 18, 2022, in corresponding European Patent Application No. 19918933.3.

* cited by examiner

NORMAL MODE OPERATION OF HYBRID ELECTRIC PROPULSION SYSTEMS

CROSS-REFERENCE TO RELATED APPLICATION

This application claims priority to and the benefit of U.S. Provisional Patent Application Ser. No. 62/812,662, filed Mar. 1, 2019, the contents thereof being incorporated herein by reference in their entirety.

BACKGROUND

1. Field

This disclosure relates to aircraft and engines therefor, and more particularly to hybrid electric aircraft engines.

2. Description of Related Art

Aircraft engines vary in efficiency and function over a plurality of parameters, such as thrust requirements, air temperature, air speed, altitude, and the like. Aircraft require the most thrust at takeoff, wherein the demand for engine power is the heaviest. However, during the remainder of the mission, the aircraft engines often do not require as much thrust as during takeoff. The size and weight of the engines allows them to produce the power needed for takeoff, however after take-off the engines are in effect over-sized for the relatively low power required to produce thrust for cruising in level flight.

Such conventional methods and systems have generally been considered satisfactory for their intended purpose. However, there is still a need in the art for improved aircraft engines. The present disclosure provides a solution for this need.

SUMMARY

A hybrid electric engine control module (ECU) configured to be operatively connected to a hybrid electric aircraft powerplant having a heat engine system and an electric motor system to control a torque output from each of the heat engine system and the electric motor system, the ECU being configured to determine whether the electric motor system and/or the heat engine system are in a normal mode such that the electric motor system and/or the heat engine can provide a predetermined amount of torque (e.g., full power). The ECU can be configured to receive a total torque setting and split output power between the electric motor system and the heat engine system in accordance with the normal mode as a function of the total torque setting.

The ECU can include a torque splitting module configured to receive a total torque value, and determine a torque split of the total torque value between the electric motor system and the heat engine system, and control the electric motor system and the heat engine system to produce the total torque value in accordance with the determined torque split in accordance with the normal mode. In certain embodiments, the ECU can include a total torque module configured to receive one or more input values including at least a power lever (PLA) setting, determine the total torque value as a function of the one or more input values, and output the total torque value to the torque splitting module.

In the normal mode and at a maximum total torque setting, the torque split can include maximum heat engine system torque and maximum electric motor system torque. For example, in the normal mode and a takeoff power setting (e.g., PLA set to takeoff), the torque split can include a maximum heat engine system torque and maximum electric motor system torque.

In the normal mode and at a total torque setting less than maximum but greater than maximum heat engine system torque, the torque split can include maximum heat engine system torque and at least some electric motor system torque. For example, in the normal mode and a cruise climb power setting (e.g., a PLA setting for cruise climb), the torque split can include maximum heat engine system torque and less than maximum electric motor system torque.

In the normal mode and at a total torque setting equal to or less than maximum heat engine system torque (e.g., PLA at or below a cruise setting), the torque split can include at least some heat engine system torque and no electric motor system torque. For example, in the normal mode and a cruise power setting (e.g., that requires equal or less than full heat power), the torque split can include only heat engine system torque such that no electric motor system torque is used.

In certain embodiments, where a state-of-charge (SOC) of a battery of the electric motor system is above a minimum reserve charge, the torque split can include at least some electric motor torque (e.g., when needed at or above maximum heat engine system power). At an SOC at or below the minimum reserve SOC, the torque split may only include electric motor torque at a takeoff power setting (e.g., only when full power is commanded) to prevent battery discharge below the minimum reserve SOC (to maintain enough energy to provide at least one extra full power climb in the event of a go-around, for example).

In certain embodiments, the ECU can command recharge of the battery in at least one portion of flight when excess power is available. The at least one portion of flight can include at least one of descent, low speed cruise, slow climb, or higher altitude cruise, for example. In certain embodiments, the ECU can command regenerating the battery with windmilling during descent or partial descent as a function of descent rate from a pilot command, flight control command, or ECU calculated rate of descent based on any other suitable parameter that the ECU can use as an input.

In accordance with at least one aspect of this disclosure, a hybrid electric aircraft powerplant system can include a heat engine system configured to provide torque to a propulsion device; and an electric motor system configured to provide torque to the propulsion device in addition to and/or independently of the heat engine system. The powerplant system can include an suitable a hybrid electric engine control module (ECU) as disclosed herein (e.g., as described above).

In accordance with at least one aspect of this disclosure, a method determining whether an electric motor system and/or a heat engine system are in a normal mode such that the electric motor system and/or the heat engine can provide a predetermined amount of torque, receiving a total torque setting, and splitting output power between the electric motor system and the heat engine system in accordance with the normal mode as a function of the total torque setting. Splitting output power can include using electric motor system torque only at and above a cruise power setting.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
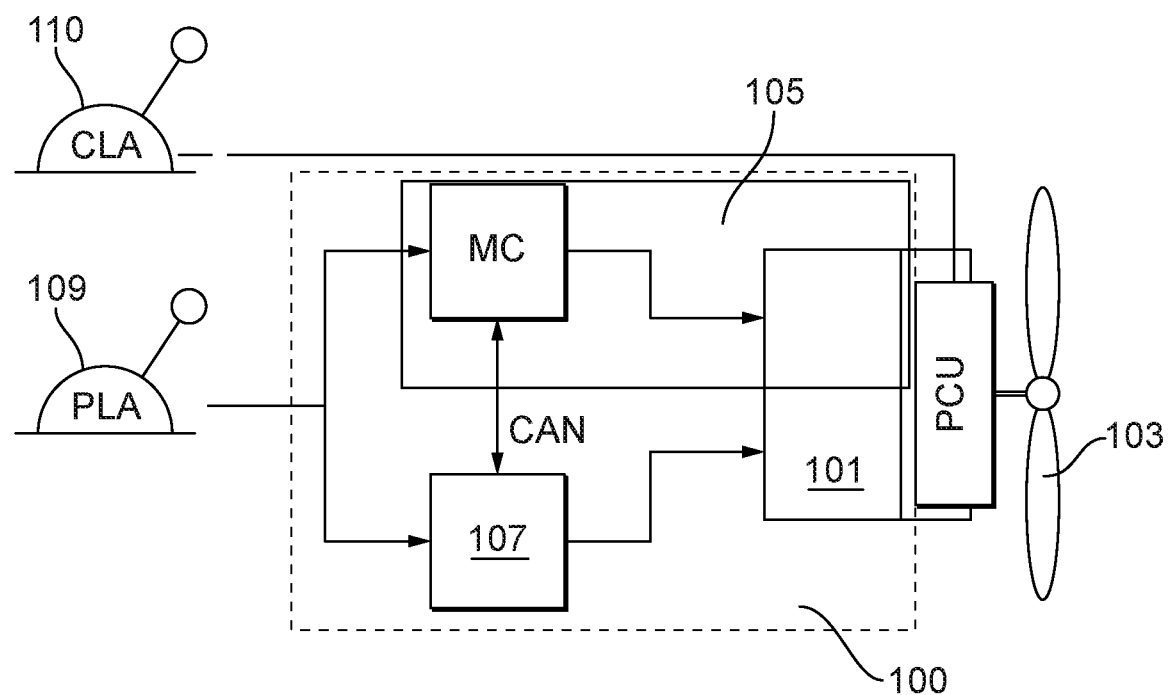
FIG. 1 is a schematic diagram of an embodiment of a hybrid electric powerplant system in accordance with this disclosure.

Reference will now be made to the drawings wherein like reference numerals identify similar structural features or aspects of the subject disclosure. For purposes of explanation and illustration, and not limitation, an illustrative view of an embodiment of a powerplant system in accordance with the disclosure is shown in FIG. 1 and is designated generally by reference character 100. Other embodiments and/or aspects of this disclosure are shown in FIGS. 2-12.

Referring to FIG. 1, a hybrid electric aircraft powerplant (HEP) system 100 can include a heat engine system 101 configured to provide torque to an air mover 103 (e.g., a propeller, fan, or any other suitable propulsion device). The heat engine of the HEP 100 can be a heat engine of any type, e.g., a gas turbine, spark ignited, diesel, rotary, or reciprocating engine of any fuel type and with any configuration. Any suitable heat engine system can include any suitable turbomachinery elements, either turbocharger, turbosupercharger, supercharger, and exhaust recovery turbo compounding, either mechanically, electrically, hydraulically or pneumatically driven, for example. An example of a rotary engine suitable for this application is disclosed in U.S. Pat. No. 10,145,291, the disclosure of which is herein incorporated by reference in its entirety.

The powerplant system 100 can also include an electric motor system 105 configured to provide torque to the air mover 103 in addition to and/or independently of the heat engine system 101. The electric motor system 105 and the heat engine system 101 can be sized and configured to produce any amount of total horsepower (e.g., 2000 horsepower total, 1000 horsepower each). The electric motor system 105 can include any suitable components as appreciated by those having ordinary skill in the art in view of this disclosure (e.g., an electric motor, an electrical supply subsystem including a battery and a battery management system).

Figure 3A:
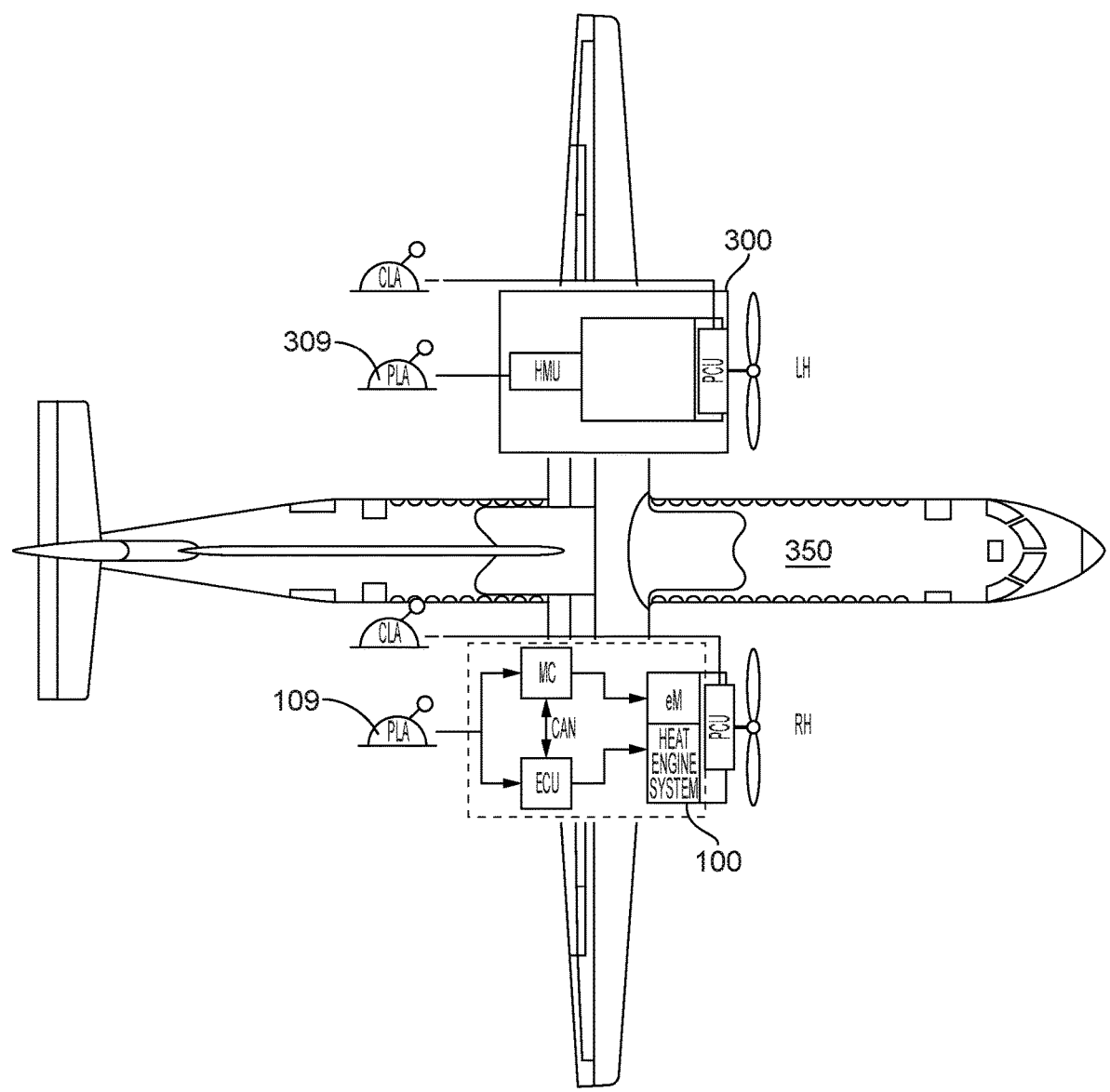
FIG. 3A is a schematic diagram of an aircraft having a hybrid electric powerplant system and a heat engine powerplant system.

The system 100 can include a hybrid electric engine control module (ECU) 107 operatively connected to the heat engine system 101 and the electric motor system 105 to control a torque output from each of the heat engine system 101 and the electric motor system 105. The ECU 107 can be and/or include any suitable embodiment of an ECU disclosed herein. For example, the ECU 107 can be configured to receive a torque command (e.g., a power lever angle from a power lever (PLA) 109 and/or other module) and split output power between the electric motor system 105 and the heat engine system 101. Additionally and/or alternatively, the ECU 107 can be configured to balance a total torque against a second total torque of a second aircraft powerplant 300 (e.g., as shown in FIG. 3A). The ECU 107 can additionally and/or alternatively be configured to receive any suitable sensor measurements or status information (e.g., rotor speed, temperature, and pressure at various engine stations, battery state of charge, etc.) for processing the splitting of output power. In certain embodiments, the torque split can be an adaptive split that changes in real-time as a function of one or more parameters (e.g., battery state of charge, torque command, sensor information, etc.).

In certain embodiments, the torque splitting logic may use parameters that are not directly measured and may need to be synthesized in some way (e.g. temperature or pressure at various engine stations). In certain embodiments, the torque split calculation may account for various operational constraints of the heat engine system, electrical machinery, and/or energy storage, or example.

Figure 2:
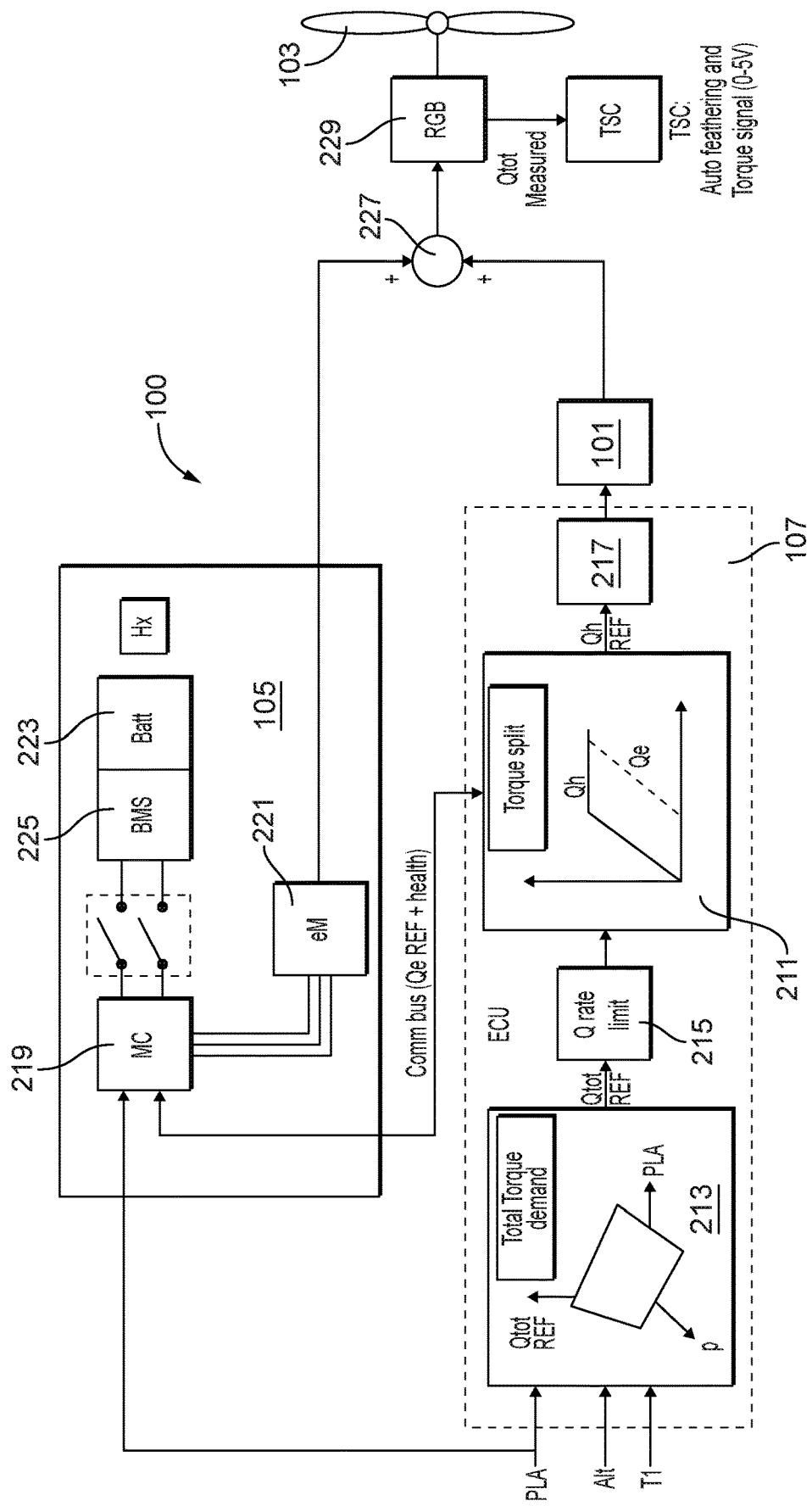
FIG. 2 is a schematic diagram of an embodiment of the hybrid electric powerplant system of FIG. 1, shown having an embodiment of an engine control module (ECU) in accordance with this disclosure.

Referring additionally to FIG. 2, the ECU 107 can include a torque splitting module 211 configured to receive a total torque value (e.g., Qtot as shown in FIG. 2 from a total torque module 213 or directly from the PLA 109 based on a setting of the PLA 109, for example). The ECU can be configured to determine a torque split of the total torque value between the electric motor system 105 and the heat engine system 101. The torque splitting module 211 can be configured to control (e.g., directly or indirectly) the electric motor system 105 and the heat engine system 101 to produce the total torque value in accordance with the determined torque split (e.g., while meeting transient and steady-state operational constraints for the heat engine, electrical motor, and battery subsystem).

In certain embodiments, the torque splitting module 211 can be configured to determine the torque split as a function of stored correlation data. In certain embodiments, for a given total torque value, lookup table or other suitable data can be used to output a correlated split between heat engine torque value (Qh) and electric motor torque value (Qe), which values ultimate control the output of the respective engine systems. For example, during takeoff, the PLA 109 may be set to a maximum power setting (e.g., 2000 horse, and the torque splitting module 211 can output a maximum Qh and a maximum Qe (e.g., 1000 horsepower from the electric motor system 105 and 1000 horsepower from the heat engine system 101). In certain embodiments, for PLA settings less than maximum power, the torque splitting module 211 can output a smaller Qe (e.g., 500 electric horsepower) and maintain a maximum Qh (e.g., 1000 horsepower). In certain embodiments, at PLA settings where the demanded total horsepower is equal to or less than a maximum Qh (e.g., less than or equal to 1000 horsepower), the torque splitting module 211 can be configured to output a Qe value of zero, thereby causing the heat engine system 101 to produce all required power which can conserve battery for situations where greater than maximum Qh is required (e.g., climb, go around).

In certain embodiments, the electric motor system 105 or the heat engine system 101 may not be able to provide a normal share of power in accordance with the torque split, e.g., due to reaching an operational limit (e.g., such as a temperature or pressure limit). For example, a torque split in cruise may be commanding full power from the heat engine system 101 (e.g., 1000 horsepower from heat engine) and less or no power from the electric motor system (e.g., 0 horsepower), but due to transient maneuver or condition, the power output of the heat engine system 101 is briefly limited (e.g., for about 1 minute or less) either by the system or by the condition (e.g., heat engine system horsepower drops to 950 HP). The ECU 107 can determine that total commanded torque is not available under the existing torque split and the torque splitting module can cause the electric motor system 105 to make up for the transient loss in horsepower from the heat engine system 101 (e.g., by providing 50 horsepower from the electric motor system 105) thereby maintaining the commanded total torque value. The reverse scenario can also be employed in certain embodiments where the heat engine system 101 can compensate for the electric motor system 105.

In certain embodiments, the torque splitting module 211 can additionally or alternatively be configured to split torque as a function of a manual input from a pilot. For example, a manual input lever for selecting an amount of electric power to be utilized can be used by a pilot. Any suitable manual control is contemplated herein.

In certain embodiments, the ECU 107 can include a total torque module 213 configured to receive one or more input values including at least a power lever setting, e.g., from the PLA 109. The total torque module 213 can be configured to determine the total torque value (Qtot) as a function of the one or more input values and output the total torque value to the torque splitting module 211. The one or more input values can further include at least one of an altitude, a total temperature, air density, a condition lever (CLA) 110 setting, and/or the second total torque of the second aircraft powerplant. Any other suitable input values for determining total torque is contemplated herein.

In certain embodiments, referring additionally to FIG. 3A, the hybrid electric powerplant system 100 can be utilized on a multiengine aircraft 350 (e.g., a retrofit Bombardier Dash-8). In certain embodiments, the aircraft 350 may utilize a traditional powerplant (e.g., a turbomachine). The total torque module 213 can be configured to determine a total torque value using a locally stored torque map (e.g., as shown) to match or approximate the second total torque of the second aircraft powerplant 300 at a same power lever setting. In certain embodiments, an actual second total torque value can be provided to the total torque module 213 (e.g., from a torque sensor or other control unit) on the second powerplant 300 such that the actual second torque can be used by the total torque module 213 to determine the total torque value Qtot. Any other suitable data from any other suitable source can be utilized to allow the total torque module 213 to match or approximate the total torque of the second aircraft powerplant to reduce or eliminate asymmetric thrust.

In certain embodiments, the ECU 107 can include a torque rate limit module 215 configured to match or approximate a rate of torque change to the second aircraft powerplant 300 to match or approximate dynamic response of the second aircraft powerplant 300. The torque rate limit module 215 can limit torque increase and/or decrease as a function of any suitable data and/or inputs (e.g., based on the one or more input values and stored data such as a look up table). In embodiments where the hybrid electric powerplant system 100 is used in a multiengine aircraft that also has a second powerplant 300 that is a traditional powerplant (e.g., a turbomachine), the second powerplant may respond slower to PLA 309 setting changes than the hybrid electric aircraft powerplant system 100 responds to PLA 109 setting changes. Since the PLA 109 and the PLA 309 can be disposed together and operated simultaneously as appreciated by those having ordinary skill in the art, to avoid dynamic mismatch when changing the settings of PLA 109 and PLA 309 together, the torque rate limit module 215 can control the time of increase or decrease of the total torque value that is provided to the torque splitting module 211 when there is a change in total torque value output by the total torque module 213. In certain embodiments, the torque rate limit module 215 can receive the PLA setting and rate-limit the PLA setting change into the total torque module 213. Any other suitable way of rate limiting is contemplated herein.

The ECU 107 can include a fuel flow control module 217 configured to control fuel flow in the heat engine system 101 to control torque output of the heat engine system 101 as a function of heat engine torque value (Qh) output by the torque splitting module 211. In certain embodiments, the torque splitting module 211 can be configured to output an electric motor torque value (Qe) to a motor control module (MC) 219 of the electric motor system 105. The MC can be configured to control an electric motor 221 of the electric motor system 105 as a function of the Qe. While the MC 219 is shown as part of the electric motor system 105, it is contemplated that the motor control module 219 can be at least partially integrated with the ECU 107 or be in any other suitable location. In certain embodiments, the fuel flow control module 217 can be separate from the ECU 107 (e.g., contained within the heat engine system 101).

Figure 3B:
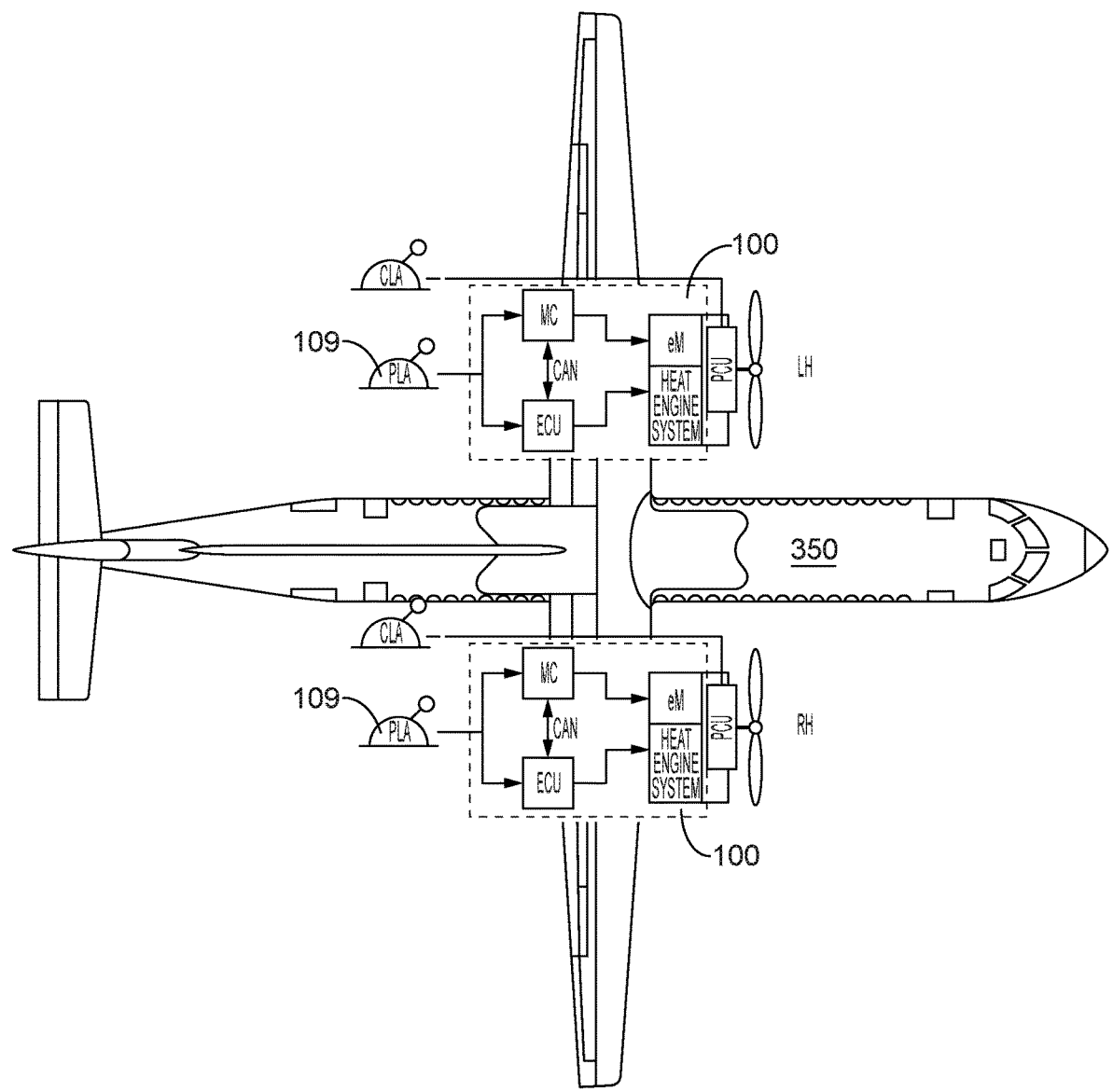
FIG. 3B is a schematic diagram of an aircraft having two hybrid electric powerplant systems.

Embodiments of a HEP disclosed herein are applicable to any suitable propulsion system distribution (e.g., single engine, multiengine). For example, a single engine aircraft can include a single HEP 100. While certain embodiments shown, e.g., as in FIG. 3A, show a single HEP 100 and a single traditional powerplant 300, it is contemplated that more than two powerplants can be used on an aircraft. It is also contemplated that both powerplants in a dual powerplant system (e.g., as shown in FIG. 3B) can be a HEP, e.g., HEP 100 as disclosed herein. Any suitable number (e.g., all) of powerplants in a system having a plurality of powerplants can be a HEP, e.g., HEP 100 as disclosed herein. One or multiple engines can be the same HEP or a different HEP or different full combustion or different full electric, or any combinations thereof. Any suitable control scheme for a single or multi HEP system is contemplated herein (e.g., a power setting map), e.g., similar to and/or the same as disclosed above.

Referring additionally to FIGS. 4-12, the ECU 107 can be configured to determine whether the electric motor system 105 and/or the heat engine system 101 are in a normal mode such that the electric motor system 105 and/or the heat engine system 101 can provide a predetermined amount of torque (e.g., full power). For example, the ECU 107 can be configured to determine whether the electric motor system 105 is not capable of producing a maximum power, or any other suitable predetermined power. The ECU 107 can additionally or alternatively be configured to determine whether the heat engine system 105 is not capable of producing a maximum power, or any other suitable predetermined power.

In certain embodiments, if the ECU 107 determines that both systems can produce the predetermined amount of power, the ECU 107 can be configured to receive a total torque setting and split output power between the electric motor system and the heat engine system in accordance with the normal mode as a function of the total torque setting. For example, the ECU 107 can operate in normal mode according to a predetermined torque splitting schedule as a function of total torque demanded (e.g., by PLA setting) and/or any other suitable flight characteristic or condition (e.g., flight phase, CLA setting).

A torque splitting module, e.g., as disclosed above, can be configured to control the electric motor system and the heat engine system to produce the total torque value in accordance with the determined torque split in accordance with the normal mode. A total torque module, e.g., as described above, can be configured to receive one or more input values including at least a power lever (PLA) setting, determine the total torque value as a function of the one or more input values in accordance with the normal mode for example, and output the total torque value to the torque splitting module.

FIGS. 4-12 show various schematic scenarios of operation of an aircraft having a HEP 100 in normal mode. In the normal mode and at a maximum total torque setting, the torque split can include maximum heat engine system torque and maximum electric motor system torque. For example, referring to FIG. 4, in the normal mode and at a takeoff power setting (e.g., PLA set to takeoff T.O. as shown), the torque split can include a maximum heat engine system torque and maximum electric motor system torque. The term maximum as used herein is can be an actual maximum or can be a normal maximum, e.g., as shown, while allowing for a reserve amount of torque (e.g., as shown) available above a normal maximum torque (e.g., setting T.O. as shown) for optional use by the pilot in certain circumstances.

Figure 4:
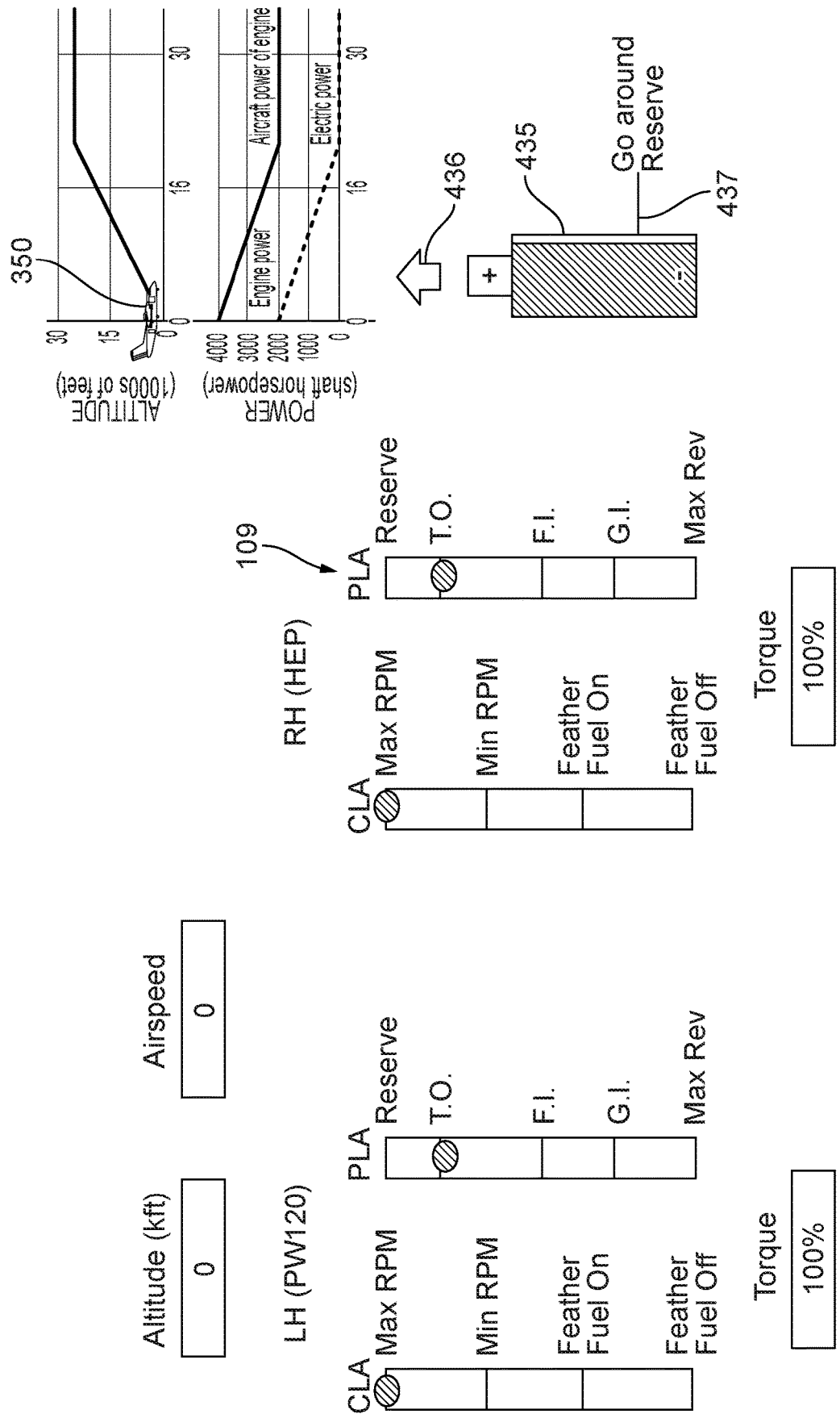
FIG. 4 is a schematic diagram of operational conditions of an aircraft having a hybrid electric powerplant system in accordance with this disclosure, shown in a takeoff power setting where takeoff electric motor system torque (e.g., maximum) is being supplied and the battery is discharging.

FIG. 4 is a schematic diagram of operational conditions of an aircraft having a hybrid electric powerplant system (HEP) 100 in a takeoff power setting where takeoff electric motor system torque (e.g., maximum/100% as shown) is being supplied and the battery is discharging. As shown, a HEP PLA 109 is set to takeoff power (T.O.).

A battery state of charge (SOC) indicator 435 can indicate to a pilot an SOC of the battery (e.g., graphically or numerically) and/or can indicate whether the battery 223 is charging (e.g., with charge flow indicator 436), discharging, or neither. The SOC indicator 435 can be a separate instrument or be integrated with any other suitable instrument. The SOC indicator 435 can be digital (e.g., part of a GUI on a glass panel or other digital instrument) and/or analog. The SOC indicator 435 can include a reserve SOC indicator 437 configured to indicate a minimum amount of energy required to execute one or more maneuvers in the aircraft (e.g., a single go-around, a plurality of go-arounds). The reserve SOC indicator 437 can be fixed or can be dynamic (e.g., to account for one or more variables, e.g., density altitude). Any suitable design for the SOC indicator 435 (e.g., a graphical battery), charge flow indicator 436 (an arrow pointing away from the battery for discharge, an arrow pointing into the battery for charge, and a line indicating no flow), and reserve SOC indicator 437 (e.g., a line displayed on or near the graphical battery) is contemplated herein.

Figure 5:
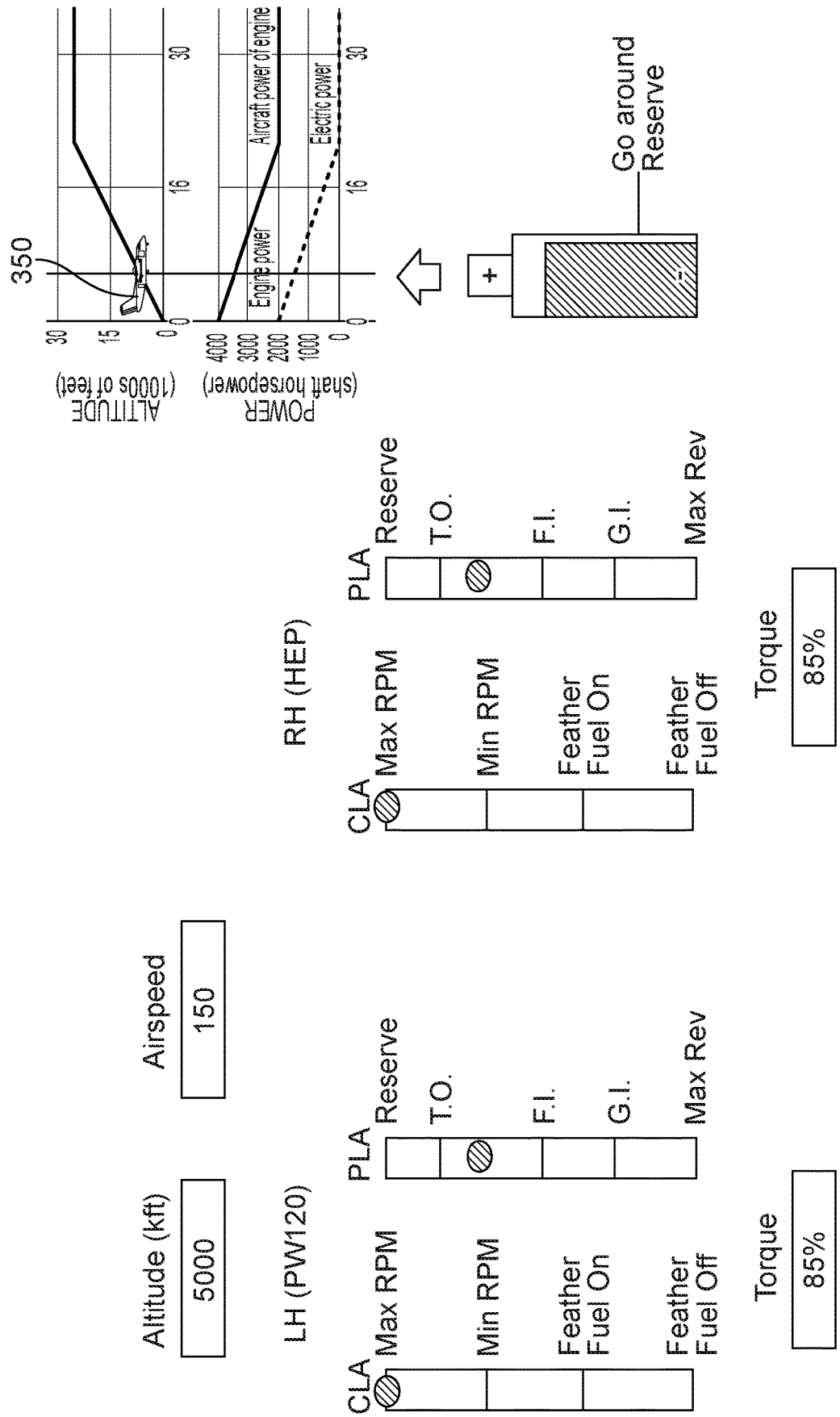
FIG. 5 is a schematic diagram of operational conditions of an aircraft having a hybrid electric powerplant system in accordance with this disclosure, shown in a cruise-climb power setting at a first altitude and speed where an electric motor system torque (e.g., less than takeoff power) is being supplied and the battery is discharging.
Figure 6:
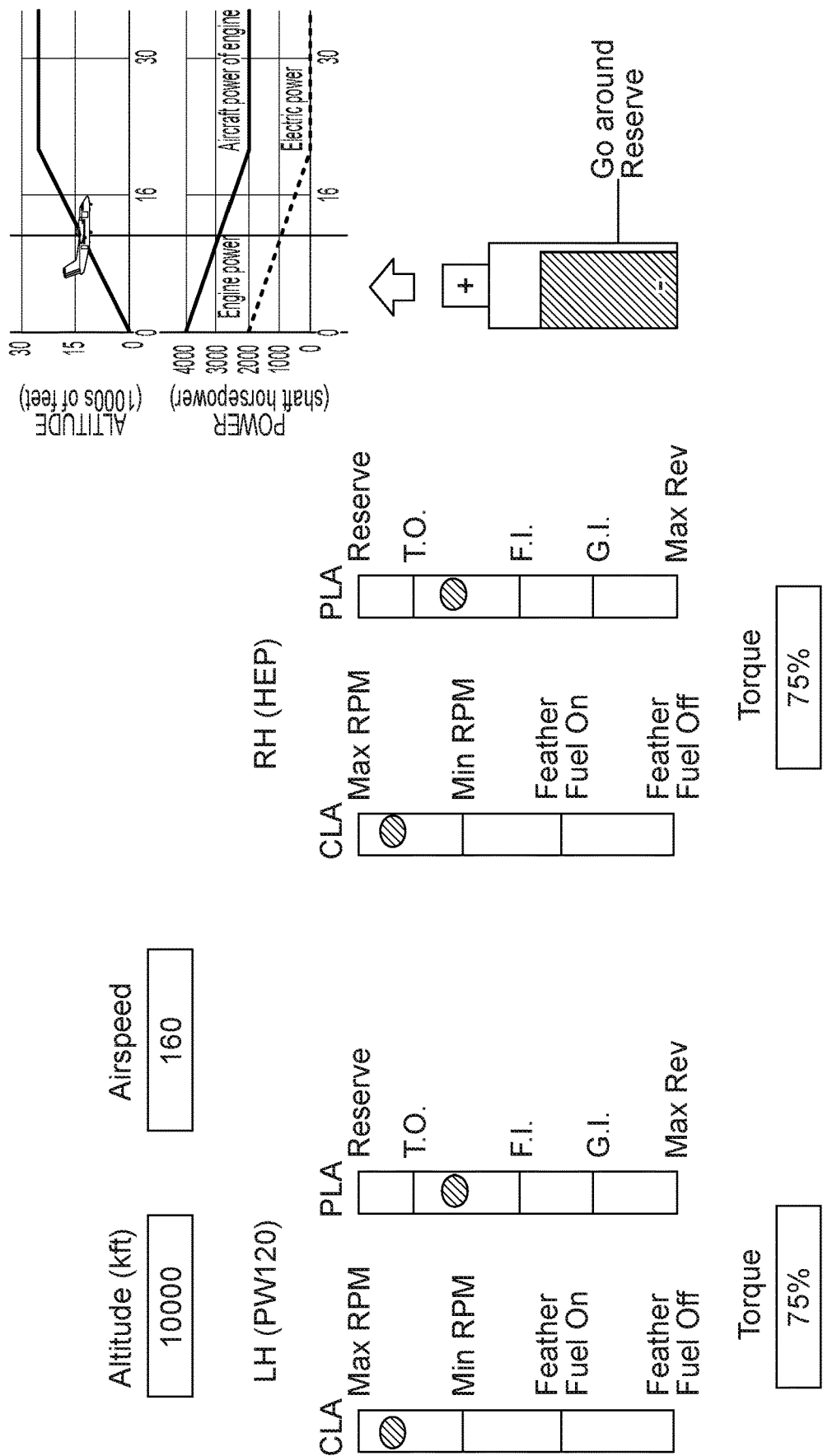
FIG. 6 is a schematic diagram of operational conditions of an aircraft having a hybrid electric powerplant system in accordance with this disclosure, shown in a cruise-climb power setting at a second altitude and speed where an electric motor system torque is being supplied and the battery is discharging.

In the normal mode and at a total torque setting less than maximum (e.g., less than T.O.) but greater than maximum heat engine system torque, the torque split can include maximum heat engine system torque and at least some electric motor system torque. For example, referring to FIGS. 5 and 6 in the normal mode and a cruise climb power setting (e.g., a PLA setting for cruise climb), the torque split can include maximum heat engine system torque and less than maximum electric motor system torque. FIG. 5 shows a cruise-climb power setting (e.g., between T.O. and flight idle F.I.) at a first altitude and speed where an electric motor system torque (e.g., less than takeoff power) is being supplied and the battery is discharging. FIG. 6 shows a cruise-climb power setting at a second altitude and speed where an electric motor system torque is being supplied and the battery is discharging.

Figure 7:
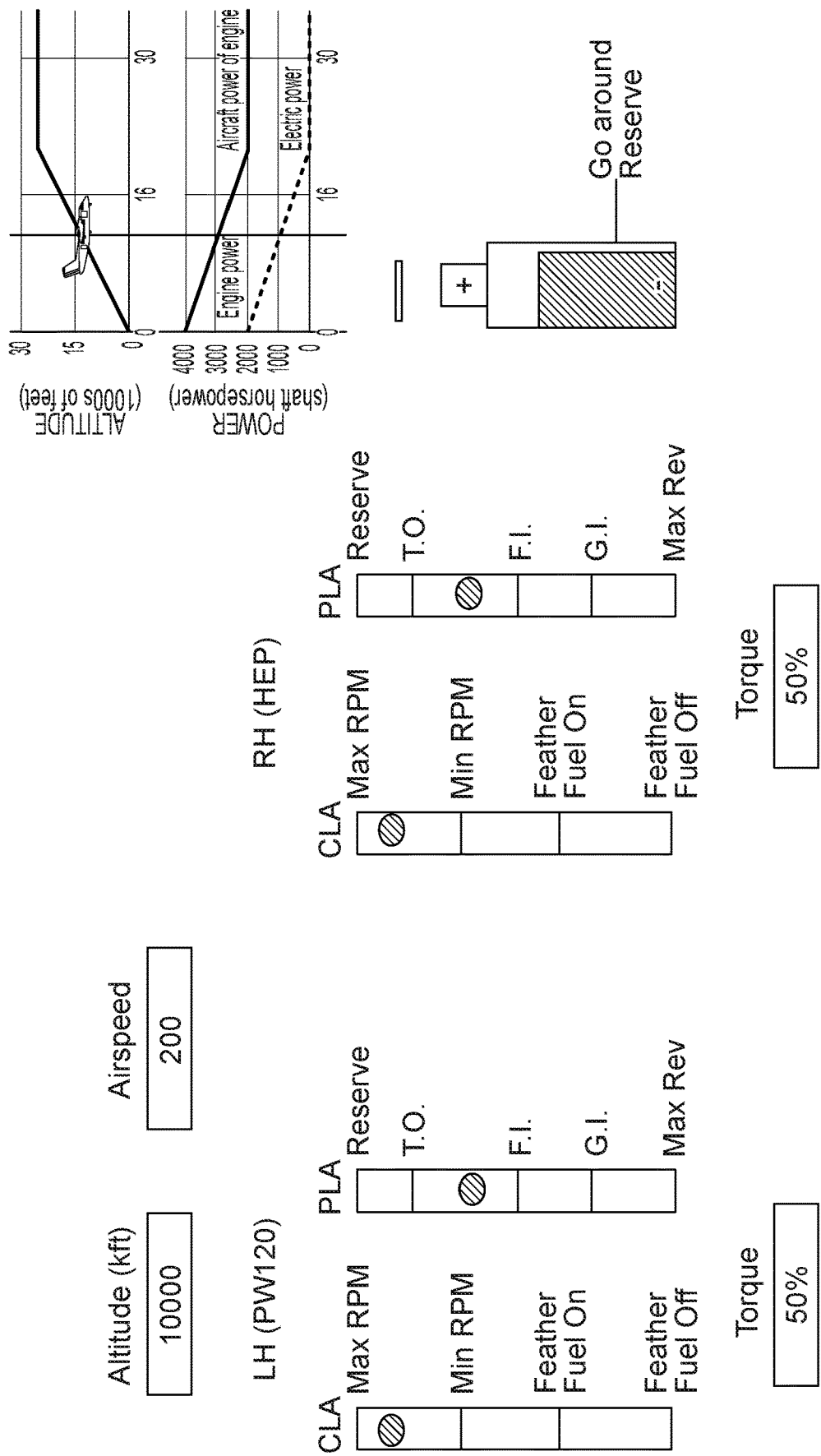
FIG. 7 is a schematic diagram of operational conditions of an aircraft having a hybrid electric powerplant system in accordance with this disclosure, shown in a first level flight power setting requiring total torque at or below a maximum heat engine system torque such that no electric motor system torque is being supplied and the battery is not discharging.

Referring to FIG. 7, in the normal mode and at a level power setting (e.g., a PLA setting less than cruise climb as shown), the torque split can include maximum heat engine system torque and less than maximum electric motor system torque (e.g., from 0 to less than maximum). FIG. 7 shows a first level flight power setting requiring total torque at or below a maximum heat engine system torque such that no electric motor system torque is being supplied and the battery is not discharging. At the shown setting and conditions, the heat engine system 101 is capable of producing all needed power such that energy in the battery can be saved for later higher power needs (e.g., continued climb from temporary level at less than cruise altitude).

Figure 8:
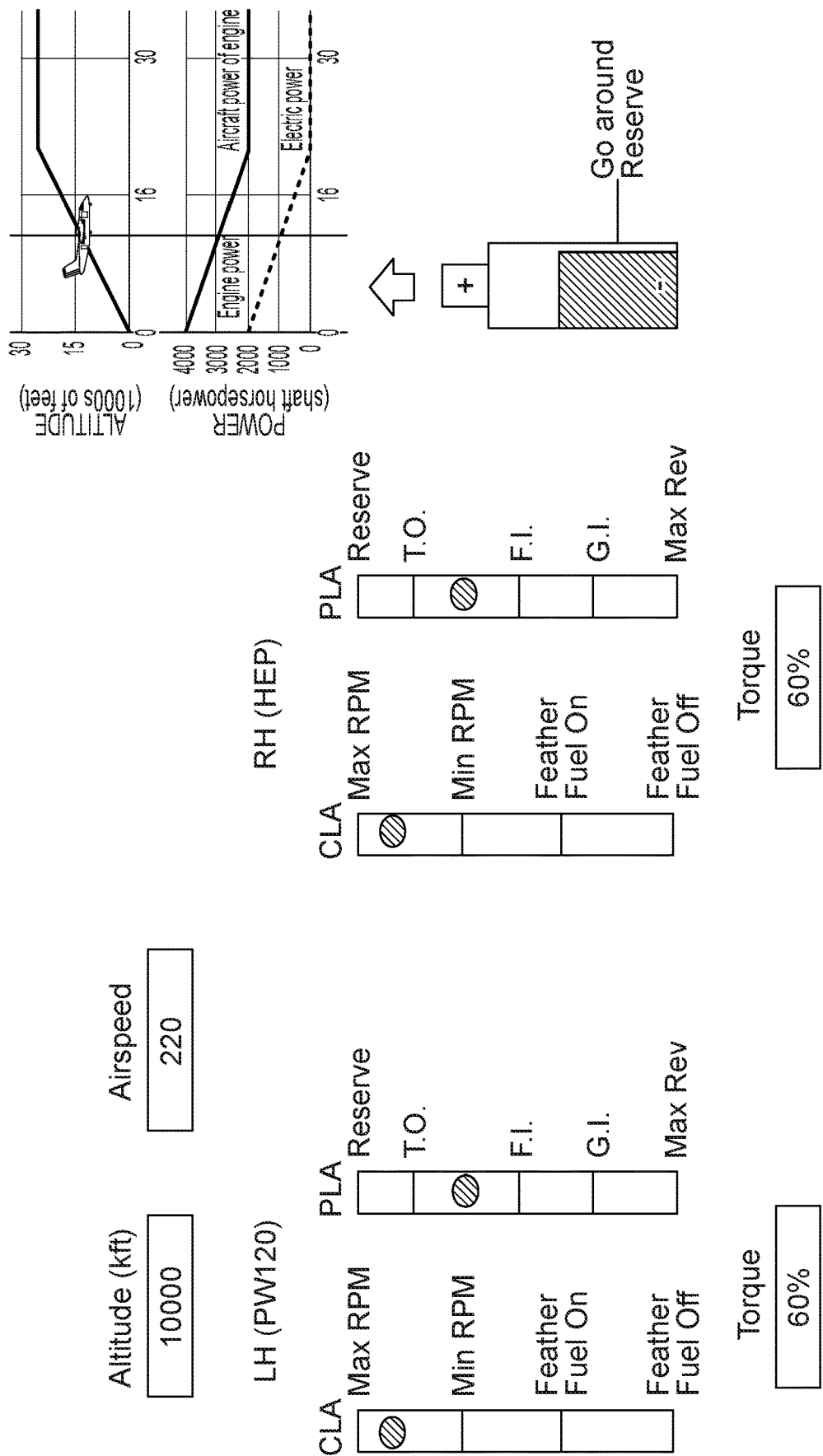
FIG. 8 is a schematic diagram of operational conditions of an aircraft having a hybrid electric powerplant system in accordance with this disclosure, shown in a second level flight power setting above a maximum heat engine system torque such that at least some electric motor system torque is being supplied and the battery is discharging.

FIG. 8 shows a second level flight power setting above a maximum heat engine system torque such that at least some electric motor system torque is being supplied and the battery is discharging. As shown, if additional speed is desired at level flight such that power demand increases above that which can be supplied by the heat engine system alone (e.g., above 50% of total torque available by both the heat engine and electric motor), the electric motor system can be used to supply the excess torque.

Figure 9:
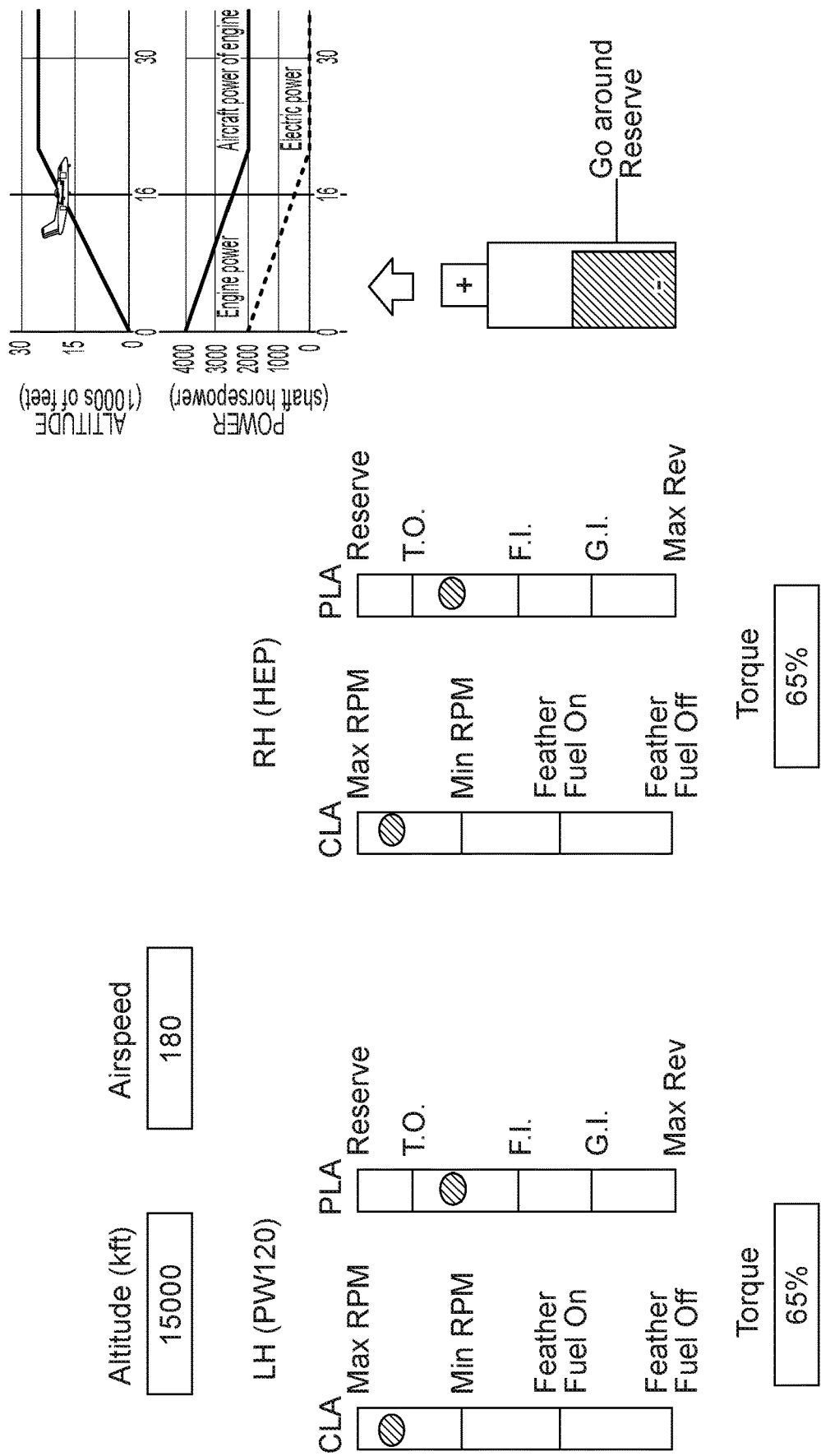
FIG. 9 is a schematic diagram of operational conditions of an aircraft having a hybrid electric powerplant system in accordance with this disclosure, shown in a cruise-climb power setting at a second altitude and speed where an electric motor system torque is being supplied and the battery is discharging.
Figure 10:
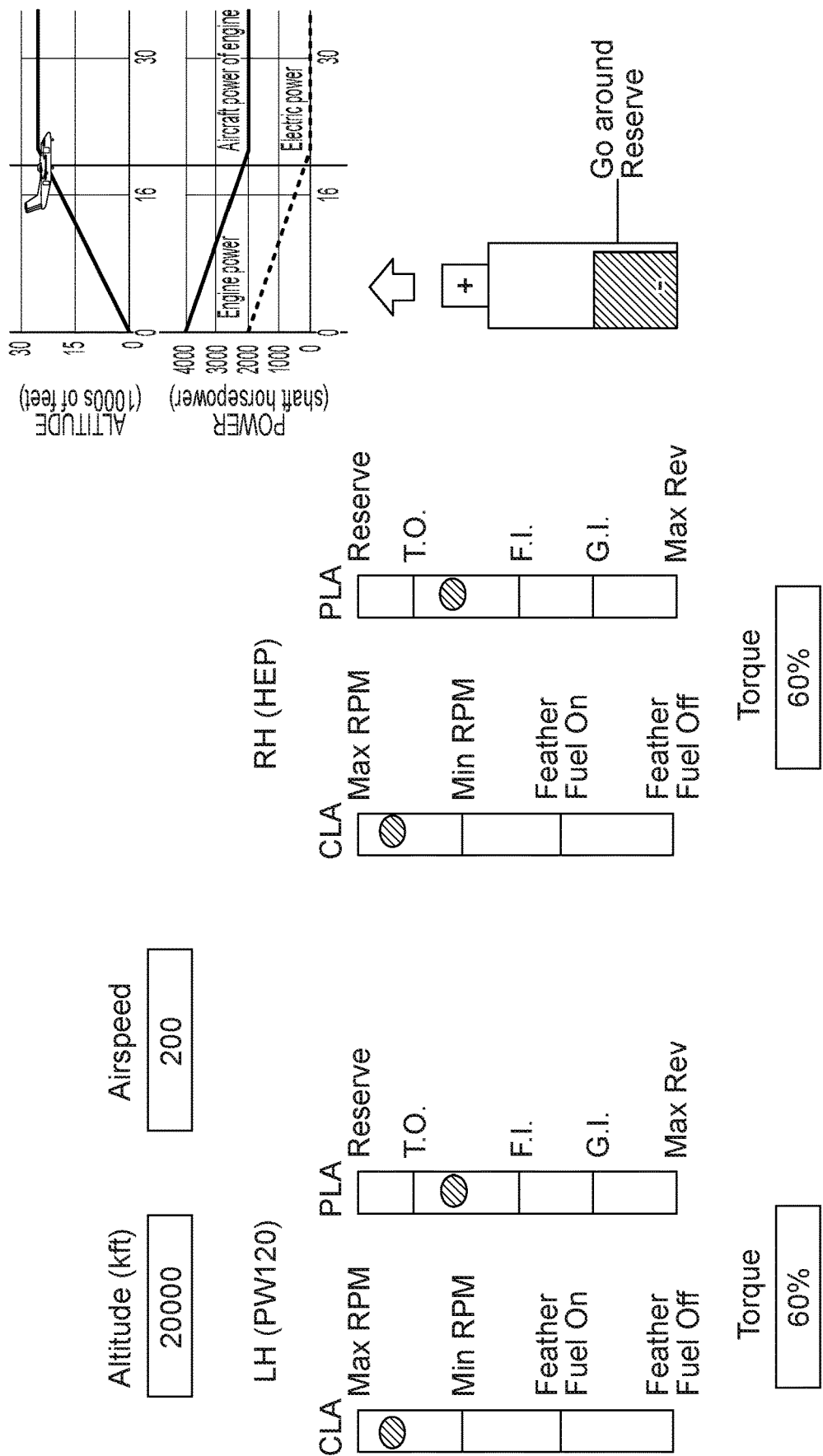
FIG. 10 is a schematic diagram of operational conditions of an aircraft having a hybrid electric powerplant system in accordance with this disclosure, shown in a cruise-climb power setting at a second altitude and speed where an electric motor system torque is being supplied and the battery is discharging.
Figure 11:
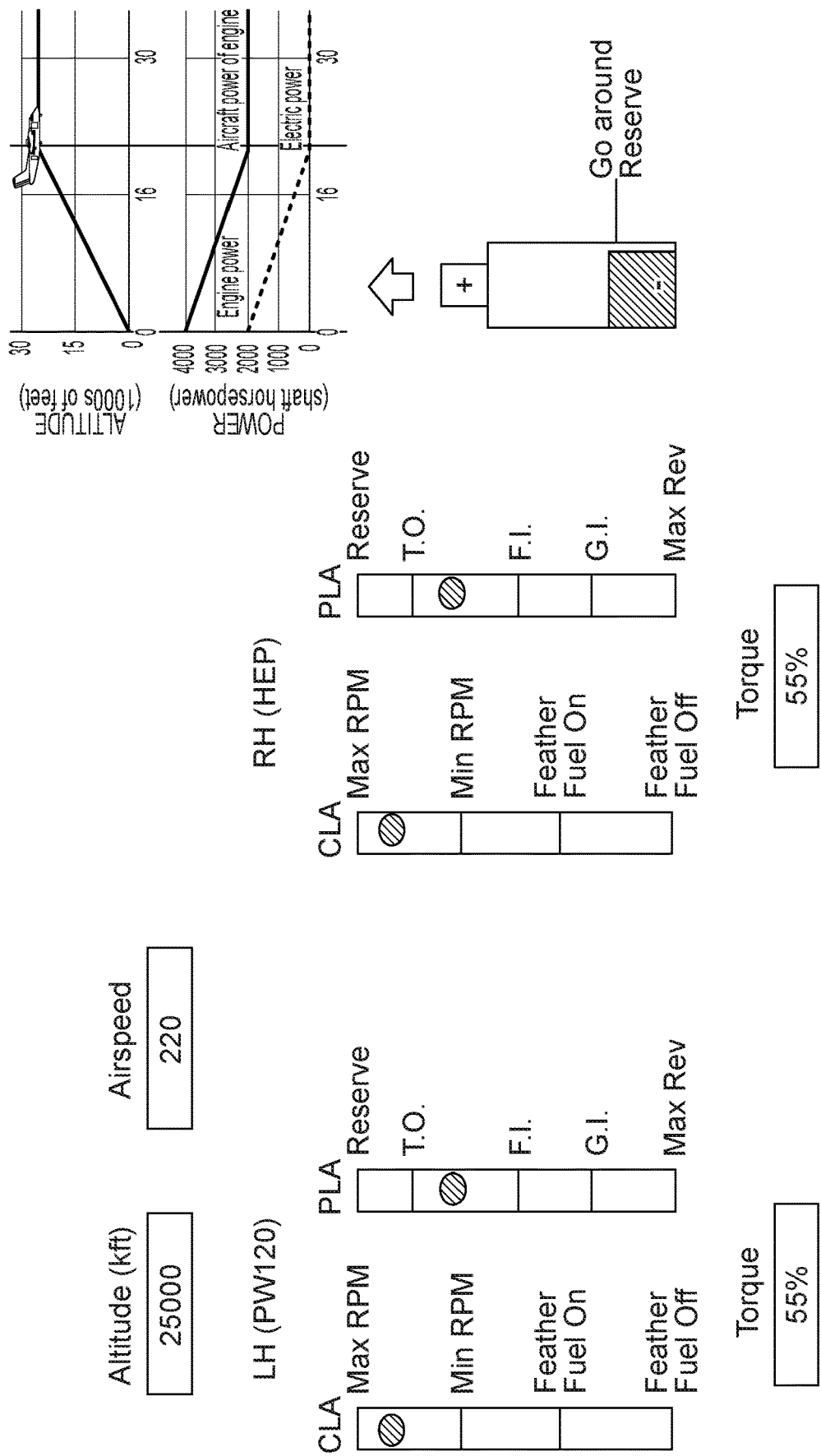
FIG. 11 is a schematic diagram of operational conditions of an aircraft having a hybrid electric powerplant system in accordance with this disclosure, shown in a cruise-climb power setting at a second altitude and speed where an electric motor system torque is being supplied and the battery is discharging.

FIG. 9 shows a cruise-climb power setting at a second altitude and speed where an electric motor system torque is being supplied and the battery is discharging. FIG. 10 shows a cruise-climb power setting at a second altitude and speed where an electric motor system torque is being supplied and the battery is discharging. FIG. 11 shows a cruise-climb power setting at a second altitude and speed where an electric motor system torque is being supplied and the battery is discharging.

Figure 12:
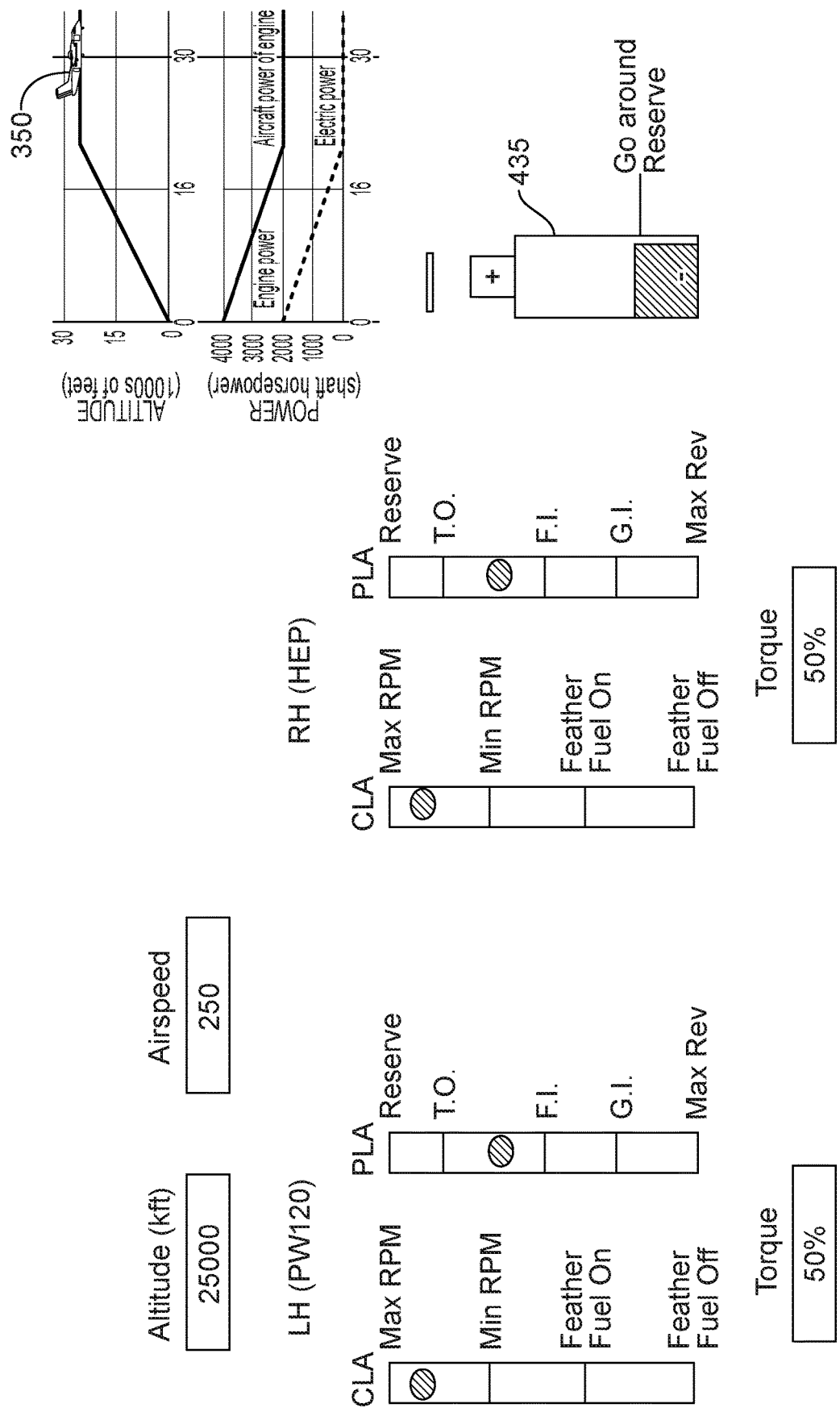
FIG. 12 is a schematic diagram of operational conditions of an aircraft having a hybrid electric powerplant system in accordance with this disclosure, shown in a cruise power setting requiring total torque at or below a maximum heat engine system torque such that no electric motor system torque is being supplied and the battery is not discharging.

Referring to FIG. 12, in the normal mode and at a total torque setting equal to or less than maximum heat engine system torque (e.g., PLA at or below a cruise setting), the torque split can include at least some heat engine system torque and no electric motor system torque. For example, in the normal mode and a cruise power setting (e.g., that requires equal or less than full heat power as shown in FIG. 12), the torque split can include only heat engine system torque such that no electric motor system torque is used. FIG. 12 shows a cruise power setting requiring total torque at or below a maximum heat engine system torque such that no electric motor system torque is being supplied and the battery is not discharging. As shown, the aircraft 350 has reached cruise altitude and has used all available non-reserve energy in the battery as shown by indicator 435.

In certain embodiments, where a state-of-charge (SOC) of a battery of the electric motor system is above a minimum reserve charge, the torque split can include at least some electric motor torque (e.g., when needed at or above maximum heat engine system power). At an SOC at or below the minimum reserve SOC, the torque split may only include electric motor torque at a takeoff power setting (e.g., only when full power is commanded) to prevent battery discharge below the minimum reserve SOC (to maintain enough energy to provide at least one extra full power climb in the event of a go-around, for example). In certain embodiments, a cockpit alarm (e.g., audio, visual, and/or tactile) can warn the pilot that the reserve line is near or reached. In certain embodiments, the ECU 107 may prevent further discharge automatically until the pilot presses an override switch or moves the PLA 109 to a predetermined override position (e.g., up to a higher power setting) to force the ECU 107 to utilize the electric motor system 105 using the reserve energy. Any other suitable control scheme for the electric motor system 105 as a function of the SOC of the battery 223 is contemplated herein.

From the flight conditions in FIG. 12, if cruise, descent, and landing can be accomplished without the need for high power settings (e.g., high power climb or cruise), then the flight can be completed without utilizing any additional energy from the battery 223 and operating efficiently on a smaller heat engine than is traditionally required for flight. If the pilot needs to execute a high power maneuver (e.g., a go-around), the pilot will have the reserve battery 223 to utilize as needed. The amount of reserve energy can be set to any suitable level (e.g., enough for at least one maximum power climb go-around in "high and hot" conditions) and/or can be a function of the battery size.

While certain figures indicate certain values (e.g., altitudes, speeds, torque), these are merely examples and may be any other suitable values as appreciated by those having ordinary skill in the art in view of this disclosure.

In accordance with at least one aspect of this disclosure, a method determining whether an electric motor system and/or a heat engine system are in a normal mode such that the electric motor system and/or the heat engine can provide a predetermined amount of torque, receiving a total torque setting, and splitting output power between the electric motor system and the heat engine system in accordance with the normal mode as a function of the total torque setting. Splitting output power can include using electric motor system torque only at and above a cruise power setting.

Any module disclosed herein can include any suitable hardware (e.g., circuitry, microprocessor, etc.) and/or software (e.g., any suitable computer code) configured to perform one or more disclosed functions of the respective module. Also, any module disclosed herein can be at least partially commonly hosted and/or integral with or at least partially separate from any other module disclosed herein as appreciated by those having ordinary skill in the art in view of this disclosure. For example, embodiments can include a separate torque split module that implements the torque split and a separate engine control module that controls the thermal engine. In certain embodiments, the can be hosted together in any suitable manner (e.g., on the same hardware and/or software).

The electric motor system 105 can include any suitable components (e.g., electric motor 221, a battery 223, a battery management system 225), and can be configured to supply any suitable type of power supply (e.g., 3 phase as shown). The heat engine system 101 can include any suitable type of heat engine. The powerplant system 100 can include a combining gear box 227 configured to combine the outputs of the electric motor system 105 and the heat engine system 101 to combine torque to the air mover 103. As appreciated by those having ordinary skill in the art, any other suitable components for the hybrid power plant system 100 is contemplated herein (e.g., a reduction gear box 229, a propeller control unit, a propeller).

Certain embodiments allow power generation of a traditional aircraft at least up to the cruise phase of flight. When certain embodiments reach target altitude (e.g., normal cruise altitude for aircraft 350), level flight at the normal aircraft speed can be achieved by the HEP 100 (e.g., using heat engine only). At that point, no electric assist is required to fly up to the target speed and the battery SOC remains constant (no discharge), e.g., at or slightly above the go around reserve. The aircraft can complete its cruise leg, descent, and land at destination without further electric power required.

Certain embodiments may provide a recharge function available in normal mode operation which may require coordination of the ECU 107, electric motor controller MC and the battery management system BMS. In certain embodiments, recharge can be done at any point where power demand is below 100% heat engine power, for example. In certain embodiments, the heat engine can be oversized to provide recharge capability at cruise, for example. In certain embodiments, aircraft speed can be reduced slighted (e.g., about 10 kts, about 10% power, or any suitable amount reduction) so the battery can be recharged without the engine being oversized by flying slower and using the freed power to recharge. Regeneration can also be implemented during certain portions of the descent flight leg, for example. Regeneration during descent can allow downsizing of the battery without loss of mission fuel burn reduction due to heat engine recharge, which burns fuel.

Certain embodiments allow torque splitting to match one or more other aircraft engines in takeoff and climb operations, and throttling back of heat engine (e.g., combustion) power may only occur at level or descending flight conditions or slower climb rate. Embodiments can manage the electric energy to climb up to altitude. The BMS can know how much energy is left and monitor the storage/discharge. Embodiments can measure remaining battery, make calculations on impact to flight, and adjust power output of the electric motor system accordingly. Any suitable sensors, sources, and data calculation to provide this information is contemplated herein (e.g., one or more sensors connected to the ECU 107 and/or BMS 225).

Embodiments can calculate and display the maximum altitude, or the maximum climb rate that can be achieved with current energy storage (e.g., based on a fixed correlation, or based on additionally on one or more flight variables, e.g., as density altitude, selected airspeed, or any other suitable factors). Certain embodiments can regenerate electricity in any suitable manner (e.g., by windmilling the propeller and/or by recharge in cruise if the heat engine is sized to be large enough to both cruise at a desired speed and provide enough excess energy to charge the battery). In certain embodiments, a pilot may have the option to reduce airspeed and use excess heat engine power to charge the battery. In certain embodiments, the ECU can command recharge of the battery in at least one portion of flight when excess power is available. The at least one portion of flight can include at least one of descent, low speed cruise, slow climb, or higher altitude cruise, for example. In certain embodiments, the ECU can command regenerating the battery with windmilling during descent or partial descent as a function of descent rate from a pilot command, flight control command, or ECU calculated rate of descent based on any other suitable parameter that the ECU can use as an input.

While this disclosure refers to certain levers (PLA, CLA, manual lever), the term lever is not limited to a physical lever, and includes any suitable control structure. For example, certain embodiments of levers can include a dial, a digital interface, or any other suitable control for use by a pilot in commanding inputs.

In accordance with at least one aspect of this disclosure, a computer implemented hybrid electric aircraft powerplant control method can include receiving one or more power input values including at least a power lever command, determining a total torque demand based on the one or more power input values to create a total torque value, and splitting the total torque value into an electric motor torque value and heat engine torque value. The method can include controlling an electric motor system as a function of the electric motor torque value and controlling a heat engine system as a function of the heat engine torque value to cause the powerplant to meet the total torque demand.

The method can include matching or approximating the total torque value to a second total torque of a second aircraft powerplant at a same power setting. The method can include controlling torque change rate to match or approximate a second torque change rate of a second aircraft powerplant. The one or more power input values further include at least one of an altitude, a total temperature, a condition lever setting, and/or the second total torque of the second aircraft powerplant, for example. Any other suitable methods and/or portions thereof are contemplated herein.

In accordance with at least one aspect of this disclosure, an aircraft 350 can have a hybrid-electric powerplant system as disclosed above in place of a traditional powerplant, and a second powerplant that is a traditional powerplant. Embodiments can include propulsion delivered by a propeller driven by both an electric motor system and a heat engine system. Certain embodiments include 50/50 power split between the electric motor and heat engine power lanes (such that each engine/motor provides the same maximum power). Any other power split is contemplated herein. The electric motor control module can selectively provide energy from the battery to the electric motor. The battery can be located in the aircraft cabin, for example.

In embodiments, the battery, the BMS system and motor control module can be located in the cabin. A high voltage (e.g., about 1 kV) AC distribution system can transmit electrical power from the motor control module to the electric motor that is mechanically parallel with the heat engine. The propeller condition lever (CLA) can control the propeller control unit (PCU) as appreciated by those having ordinary skill in the art. In certain embodiments, the CLA command may be optionally read by the ECU. The ECU can be the master Power Management System (PMS) and can control the total power request and limits as well as torque split between the heat engine and the electric motor.

Embodiments of an ECU can calculate the total torque demand for the HEP based on the PLA power demand and flight operating conditions to mimic a traditional engine (e.g., turbomachine) steady response and transient torque response. The ECU can then calculate the torque split between the heat engine and the electric motor. The torque split may include electric compensation during a transient or limited power condition (e.g., temperature, boost compressor running line) of the heat engine. The ECU can then send the electric torque command to the electric motor control module via any suitable communication pathway (e.g., a digital communication link). The motor control module then command proper AC voltage and current to the electric motor. The raw PLA setting input can also be read by the motor control module for health assessment of the ECU and for direct control based on the PLA settings in certain degraded operational modes (e.g., wherein ECU is not functional).

Embodiments can balance torque between two powerplants on aircraft (e.g., a combination of one or more HEP and one or more traditional engines) such that either the HEP matches sensed torque output of a traditional engine, or calculates what torque setting should be to match or approximate the traditional engine torque (e.g., based on throttle inputs, altitude, etc.). Embodiments can balance torque between two or more HEP powerplants (e.g., as shown in FIG. 3B), or any other suitable combination of at least one HEP powerplant and at least one of any other type of powerplant (e.g., a turbomachine, piston, hybrid, full electric). Embodiments include a torque rate limiter for when power lever is moved since the HEP system achieves torque faster than a traditional engine (e.g., a turbomachine) to slow torque changes to match or approximate torque changes of the traditional engine. Embodiments as disclosed herein provide fuel use reduction among other benefits.

As will be appreciated by those skilled in the art, aspects of the present disclosure may be embodied as a system, method, or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

Any suitable combination(s) of any disclosed embodiments and/or any suitable portion(s) thereof are contemplated herein as appreciated by those having ordinary skill in the art.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A hybrid electric engine control module (ECU) configured to be operatively connected to a hybrid electric aircraft powerplant having a heat engine system and an electric motor system to control a torque output from each of the heat engine system and the electric motor system, the ECU being configured to:

determine that the hybrid electric aircraft powerplant is in a normal mode such that the electric motor system and the heat engine can provide a predetermined amount of torque;

receive a first power lever (PLA) setting associated with a first total torque setting;

split output power between the electric motor system and the heat engine system in accordance with the normal mode as a function of the first total torque setting so that the electric motor system outputs a first electric motor system torque and the heat engine system outputs a first heat engine system torque;

receive a second PLA setting associated with a second total torque setting lower than the first total torque setting; and split output power between the electric motor system and the heat engine system in accordance with the normal mode as a function of the second total torque setting so that the electric motor system outputs a second electric motor system torque lower than the first electric motor system torque and the heat engine system outputs the first heat engine system torque.

2. The ECU of claim 1, further comprising a torque splitting module configured to:
receive a total torque value; and
determine a torque split of the total torque value between the electric motor system and the heat engine system; and
control the electric motor system and the heat engine system to produce the total torque value in accordance with the determined torque split in accordance with the normal mode.

3. The ECU of claim 2, further comprising a total torque module configured to:
determine the total torque value as a function of the first PLA setting or the second PLA setting; and
output the total torque value to the torque splitting module.

4. The ECU of claim 2, wherein in the normal mode and at a maximum total torque setting, the torque split includes maximum heat engine system torque and maximum electric motor system torque.

5. The ECU of claim 4, wherein in the normal mode and at a total torque setting less than maximum but greater than maximum heat engine system torque, the torque split includes maximum heat engine system torque and at least some electric motor system torque.

6. The ECU of claim 5, wherein in the normal mode and at a total torque setting equal to or less than maximum heat engine system torque, the torque split includes at least some heat engine system torque and no electric motor system torque.

7. The ECU of claim 2, wherein in the normal mode and a takeoff power setting, the torque split includes maximum heat engine system torque and maximum electric motor system torque.

8. The ECU of claim 7, wherein in the normal mode and a cruise climb power setting, the torque split includes maximum heat engine system torque and less than maximum electric motor system torque.

9. The ECU of claim 8, wherein in the normal mode and a cruise power setting, the torque split includes only heat engine system torque.

10. The ECU of claim 9, wherein when a state-of-charge (SOC) of a battery of the electric motor system is above a minimum reserve charge, the torque split can include at least some electric motor system torque, wherein at an SOC at or below the minimum reserve SOC, the torque split can only include electric motor system torque at a takeoff power setting.

11. A hybrid electric aircraft powerplant system, comprising:
a heat engine system configured to provide torque to a propulsion device;
an electric motor system configured to provide torque to the propulsion device in addition to and/or independently of the heat engine system; and
a hybrid electric engine control module (ECU) configured to be operatively connected to a hybrid electric aircraft powerplant having a heat engine system and an electric motor system to control a torque output from each of the heat engine system and the electric motor system, the ECU being configured to:
determine that the hybrid electric aircraft powerplant is in a normal mode such that the electric motor system and the heat engine can provide a predetermined amount of torque;
receive a first power lever (PLA) setting associated with a first total torque setting;
split output power between the electric motor system and the heat engine system in accordance with the normal mode as a function of the first total torque setting so that the electric motor system outputs a first electric motor system torque and the heat engine system outputs a first heat engine system torque;
receive a second PLA setting associated with a second total torque setting lower than the first total torque setting; and
split output power between the electric motor system and the heat engine system in accordance with the normal mode as a function of the second total torque setting so that the electric motor system outputs a second electric motor system torque lower than the first electric motor system torque and the heat engine system outputs the first heat engine system torque.

12. The system of claim 11, wherein the ECU further comprises a torque splitting module configured to:
receive a total torque value; and
determine a torque split of the total torque value between the electric motor system and the heat engine system; and
control the electric motor system and the heat engine system to produce the total torque value in accordance with the determined torque split in accordance with the normal mode.

13. The system of claim 12, wherein the ECU further includes a total torque module configured to:
determine the total torque value as a function of the first PLA setting or the second PLA setting; and
output the total torque value to the torque splitting module.

14. The system of claim 12, wherein in the normal mode and at a maximum total torque setting, the torque split includes maximum heat engine system torque and maximum electric motor system torque.

15. The system of claim 12, wherein in the normal mode and a cruise climb power setting, the torque split includes maximum heat engine system torque and less than maximum electric motor system torque.

16. A method of operating a hybrid electric aircraft powerplant of an aircraft, comprising:
determining that the hybrid electric aircraft powerplant is in a normal mode such that an electric motor system and a heat engine system of the hybrid electric aircraft powerplant can provide a predetermined amount of torque;
receiving a first power lever (PLA) setting associated with a first total torque setting;
splitting output power between the electric motor system and the heat engine system in accordance with the normal mode as a function of the first total torque setting so that the electric motor system provides a first electric motor system torque and the heat engine system provides a first heat engine system torque;

receiving a second power lever (PLA) setting associated with a second total torque setting lower than the first total torque setting; and splitting output power between the electric motor system and the heat engine system in accordance with the normal mode as a function of the second total torque setting so that the electric motor system provides a second electric motor system torque system lower than the a first electric motor system torque and the heat engine system provides the first heat engine system torque.

17. The method of claim 16, wherein splitting output power includes using no electric motor system torque at a cruise power setting.

18. The ECU of claim 1, wherein the ECU commands recharge of a battery in at least one portion of flight when excess power is available.

19. The ECU of claim 18, wherein the at least one portion of flight includes at least one of descent, cruise, or climb.

20. The ECU of claim 1, wherein the ECU can command regenerating a battery with windmilling during descent or partial descent as a function of descent rate from a pilot command, flight control command, or ECU calculated rate of descent based on a parameter used by the ECU as an input.

21. The method of claim 16, wherein:
the first PLA setting is received at a first altitude of the aircraft;
the second PLA setting is received at a second altitude of the aircraft; and
the second altitude is higher than the first altitude.

22. The method of claim 16, wherein:
the first PLA setting is received during a take-off phase of flight of the aircraft; and
the second PLA setting is received during a climb phase of flight of the aircraft.

23. The method of claim 16, wherein the aircraft is a fixed-wing aircraft.

24. The method of claim 16, comprising preventing battery discharge below a minimum state of charge required to execute a go-around.

* * * * *